Feb. 10, 1942. E. M. FULKERSON ET AL Re. 22,020

ROTARY SPREADER

Original Filed Dec. 1, 1938 2 Sheets-Sheet 1

Inventor

E. M. Fulkerson
J. C. Fulkerson

By L. F. Randolph

Attorney

Feb. 10, 1942. E. M. FULKERSON ET AL Re. 22,020

ROTARY SPREADER

Original Filed Dec. 1, 1938 2 Sheets-Sheet 2

Inventor

E. M. Fulkerson

J. C. Fulkerson

By L. F. Randolph

Attorney

Reissued Feb. 10, 1942

Re. 22,020

UNITED STATES PATENT OFFICE 22,020

ROTARY SPREADER

Elmer M. Fulkerson and Jesse C. Fulkerson,
Sonora, Ky.

Original No. 2,200,165, dated May 7, 1940, Serial No. 243,469, December 1, 1938. Application for reissue February 10, 1941, Serial No. 378,326

5 Claims. (Cl. 275—8)

The present invention relates to improvements in rotary spreaders.

The primary object of the invention, is to provide a spreader for distributing lime, marl and other fertilizer material which is capable of being mounted on a motor vehicle truck and operable from the traction engine thereof.

A further object of the invention, is to provide a fertilizer spreader of the above mentioned type in which the material is fed rearwardly of the truck and is distributed therefrom in a fan-shaped arc extending outwardly beyond the side walls of the truck to thereby cover a greater spreader area.

A still further object of the invention, is to provide a rotary spreader of the above mentioned type which may be detachably connected to the chassis frame of a motor vehicle truck without requiring alterations to the truck body or spreader.

Other objects and advantages of the invention, will become apparent during the course of the following description of the accompanying drawings wherein:

Figure 3 is a vertical cross sectional view taken on line 3—3 of Figure 1 looking in the direction of the arrows showing the material feed conveyor in the hopper and further showing the manner in which the spreader is supported on the chassis frame of a motor vehicle.

Figure 5 is a horizontal cross sectional view taken on line 5—5 of Figure 4 looking in the direction of the arrows showing in detail one of the rotary spreaders and the division plate interposed between the spreaders for directing the material to be distributed thereby.

Figure 1:
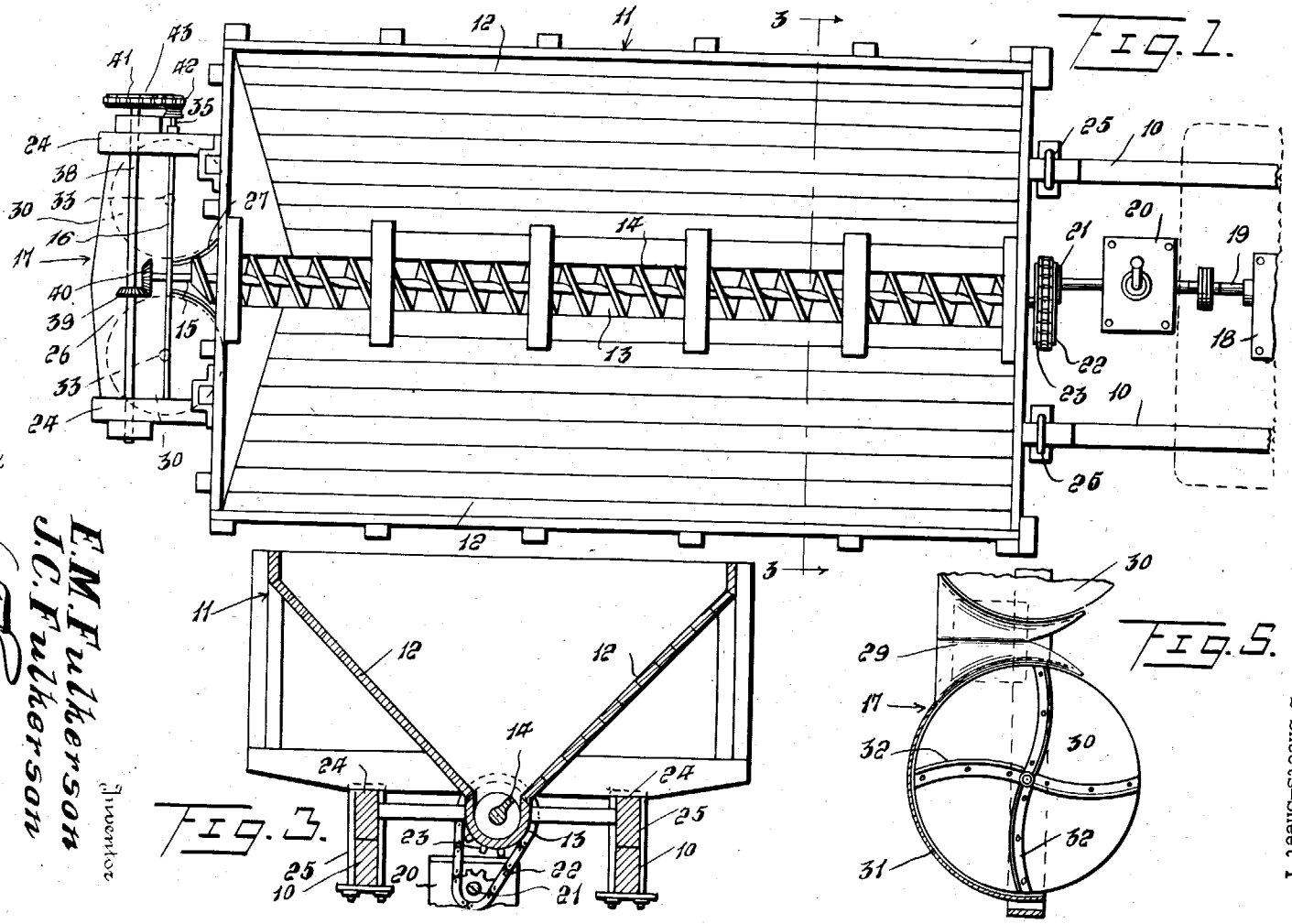
Figure 1 is a top elevational view of the spreader embodying the invention illustrating in detail, the arrangement with respect to the chassis of a conventional motor vehicle truck.
Figure 2:
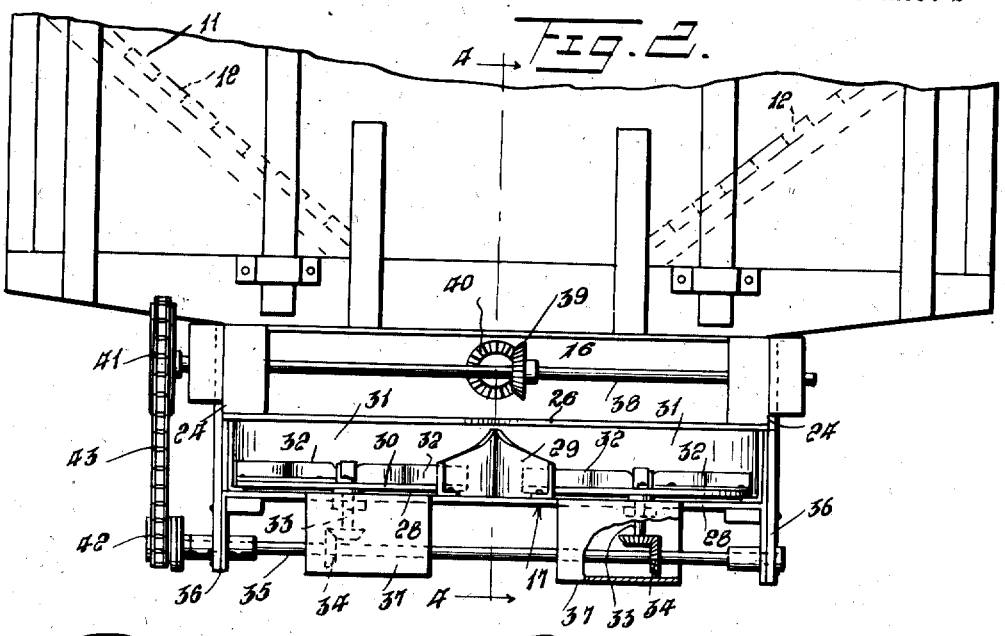
Figure 2 is a fragmentary end elevational view illustrating the position of the rotary spreaders with relation to the hopper and feed means therefor.

In the drawings, wherein like reference characters will be employed to designate like parts throughout the same, and wherein there is shown a preferred embodiment of the invention, the reference character 10 will generally be employed to designate the side chassis beams of a motor vehicle having a conventional traction motor.

Detachably mounted on the chassis beams 10 of the motor vehicle is a hopper 11 which is adapted to contain the lime, marl or other material to be distributed. As illustrated in Figure 3, the hopper is provided with inclined side walls 12 converging in a central bottom trough 13 in which is located a screw conveyor 14 for feeding the material in the hopper rearwardly toward one end to a discharge opening provided in the rear hopper wall.

The conveyor 14 is provided with a shaft 15 having its front end journaled in the front wall of the hopper and its rear end journaled in a vertical wall 16 extending transversely of the motor truck chassis and carried by a spreader structure at the rear of the hopper designated by the reference character 17.

The conveyor 14 and other parts are preferably driven from the traction motor of the truck, the same or transmission being suggested at 18 having a power take-off shaft 19 leading therefrom and including a suitable change speed gear mechanism as at 20.

Keyed to the shaft 19 to the rear of the change speed mechanism or box 20 is a sprocket wheel 21 over which is passed a sprocket chain 22 for driving a sprocket wheel 23 keyed to the shaft 15.

The spreader mechanism 17 is preferably built onto and carried by rearwardly extending portions of the beams used to secure the hopper 11 removably to the chassis 10 including side beams 24 which are rigidly attached to the hopper 11 and removably rest on the side beams 10. U bolts or clamps, as at 25 are employed for anchoring the beams 24 to the chassis frame bars 10. A plate 26 is fastened to the under surface of the rearwardly extending portions of the beams 24 and a discharge opening is provided therein as at 27 so that material fed by the screw 14 will fall through the opening 27, since it will abut and cannot travel past the wall or partition 16 previously referred to.

Also connected to the beams 24 is a pan or the like 28 which is suspended beneath the opening 27 so that the material fed by the hopper and screw conveyor will be directed to the central portion of the pan. Mounted on the pan, and disposed centrally thereof directly beneath the opening 27 is a divider 29, serving to divide the material in the hopper as it is fed through the opening 27 by the screw conveyor 14, whereby the material will be guided to the contiguous peripheries of a pair of rotary spreaders 30.

Figure 4:
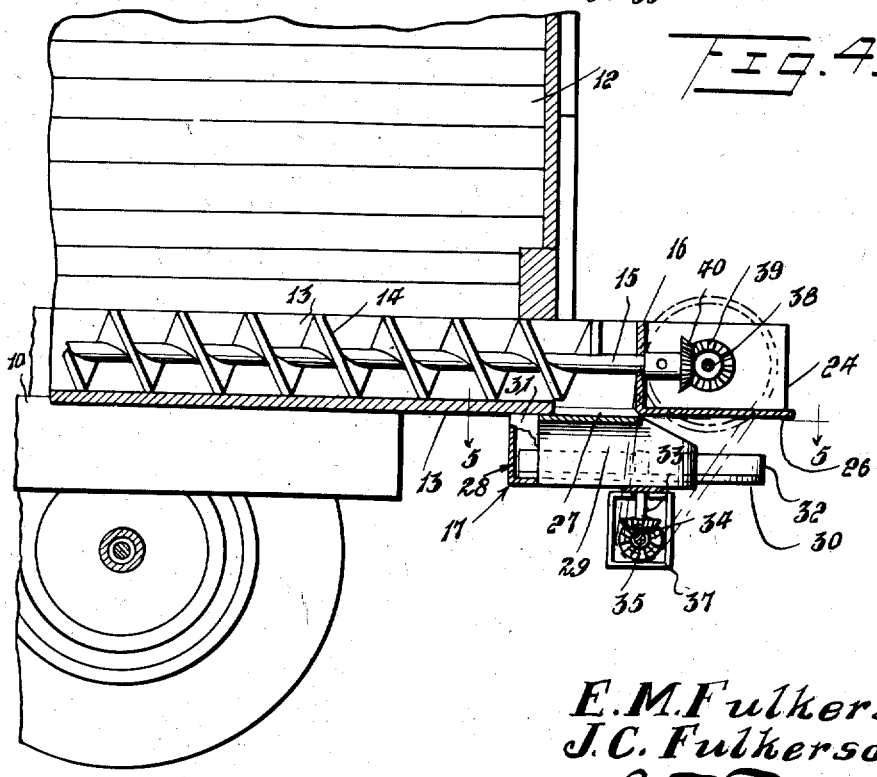
Figure 4 is a longitudinal cross sectional view taken on line 4—4 of Figure 2 looking in the direction of the arrows showing in detail structural elements of the spreader drive.

The rotary spreaders 30 are mounted in the pan 28, and are preferably provided with radial flights 32 to facilitate engagement with and discharge of the material. A vertical wall 31 surrounds the pan 28 at the sides and front and the pan on opposite sides of the divider 29 extends forwardly slightly beyond the divider as best shown in Figures 4 and 5. The former figure showing the divider in central longitudinal section. The pan 28 is open at the rear so that the spreaders will discharge or broadcast the material on both sides of the spreader.

The spreaders 30 are disk shaped and are provided with depending shafts 33 journaled in the bottom wall of the pan 28. Secured to the lower ends of the shafts 33 are bevel gears which are adapted to engage beveled gear wheels 34 mounted in spaced relation on a transverse shaft 35, the ends of which are journaled in suitable bearings 36 depending from the pan 28. Hoods or guards 37 are secured to the underside of the pan 28 to protect the bevel gears against the material being discharged.

Parallel with the shaft 35 and journaled in the upper portion of the aforesaid bearings 36, is a shaft 38, the same also passing through the rear portions of the beams 24. Mounted on the shaft 38 is a beveled gear wheel 39 which is keyed thereto and enmeshed with a beveled gear wheel 40 located on the rear end of the shaft 15. Sprocket gear wheels 41 and 42, are respectively keyed to the shafts 38 and 35 and a sprocket chain 43 is passed therearound so that the spreaders will be driven from the shaft 19.

It will be realized, that the device is driven by the traction motor or mechanism of the truck and that the same in effect, forms a unit which may be applied to the chassis of the truck, the driving mechanism and power take-off being detachably connected in any suitable manner from a propeller shaft or other shaft of the motor of the truck.

It is to be understood, that the form of the invention herewith shown and described is to be taken as a preferred embodiment of the same and that various changes in the shape, size and arrangement of parts may be resorted to without departing from the spirit of the invention or the scope of the subjoined claims.

What we claim is:

1. A device of the class described, comprising a hopper having attaching beams, a conveyor in said hopper, means to drive the conveyor, said beams having portions extending rearwardly beyond the hopper, a plate secured to said portions having an opening through which the conveyor discharges material, a pan secured to said portions to receive said material, an abutment partition secured to said portions at the rear of said opening constituting a bearing for the conveyor, spreader means on said pan, means to drive the spreader means operatively connected to the conveyor at the rear of said partition comprising parallel shafts, means gearing the shafts together, means to drive the spreader means from one of the shafts, and means at the sides of the pan extending above and below it and serving as bearings for both of said parallel shafts.

2. A device of the class described, comprising a hopper having attaching beams, a conveyor in said hopper, means to drive the conveyor, said beams having portions extending rearwardly beyond the hopper, a plate secured to said portions having an opening through which the conveyor discharges material, a pan secured to said portions to receive said material, an abutment partition secured to said portions at the rear of said opening constituting a bearing for the conveyor, spreader means on said pan, means to drive the spreader means operatively connected to the conveyor at the rear of said partition comprising parallel shafts, means gearing the shafts together, gearing to rotate the spreader means from one of the shafts, and means at the sides of the pan extending above and below it and serving as bearings for both of said parallel shafts, guards for said gearing and a divider for the material disposed below the said opening and in said pan.

3. A material spreader comprising a truck having a chassis, a hopper secured to the chassis having front and rear end walls and converging side walls, an opening in said rear end wall at the point of convergence of the side walls and a horizontal discharge opening located outwardly of and adjacent said rear end wall, a screw conveyor extending longitudinally of the hopper mounted at the point of convergence of said side walls and having its rear portion extending outwardly of said opening and projecting above the horizontal discharge opening, a pair of rotary spreaders having their contiguous peripheries mounted beneath the discharge opening to receive material therefrom and means for driving the conveyor and spreaders.

4. A material spreader comprising a truck having a chassis frame, a hopper having a subframe coextensive with the chassis frame adapted to be secured thereto, said hopper having front and rear end walls and converging side walls, an opening in said rear end wall at the point of convergence of the side walls and a horizontal discharge opening located outwardly of and adjacent said rear end wall, a screw conveyor extending longitudinally of the hopper mounted at the point of convergence of said side walls and having its rear portion extending outwardly of said opening and projecting above the horizontal discharge opening, a pair of rotary spreaders having their contiguous peripheries directly beneath the discharge opening to receive material from the screw conveyor during rotation thereof to throw the material in a fan shaped arc rearwardly of the hopper and means for driving the conveyor and spreaders in unison, said screw conveyor constituting a closure for said opening when inoperative.

5. A material spreader comprising a truck having a chassis, a hopper secured to the chassis having front and rear end walls and converging side walls, an opening in said rear end wall at the point of convergence of the side walls and a horizontal discharge opening located outwardly of and adjacent said rear end wall, a screw conveyor extending longitudinally of the hopper mounted at the point of convergence of the side walls and having its rear portion extending outwardly of said opening and traversing the horizontal discharge opening, a pair of rotary spreaders mounted beneath the discharge opening with their contiguous peripheries therebeneath, dividing means positioned beneath said discharge opening for conducting material to said spreaders whereby material will be thrown in a fan shaped arc rearwardly of the truck and means for driving the conveyor and spreaders.

ELMER M. FULKERSON.
JESSE C. FULKERSON.